(12) United States Patent
Chou et al.

(10) Patent No.: US 8,797,386 B2
(45) Date of Patent: Aug. 5, 2014

(54) AUGMENTED AUDITORY PERCEPTION FOR THE VISUALLY IMPAIRED

(75) Inventors: Philip A. Chou, Bellevue, WA (US); Zhengyou Zhang, Bellevue, WA (US); Dinei Florencio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 13/092,276

(22) Filed: Apr. 22, 2011

(65) Prior Publication Data

US 2012/0268563 A1  Oct. 25, 2012

(51) Int. Cl.
*H04N 13/02* (2006.01)

(52) U.S. Cl.
CPC ....... *H04N 13/0239* (2013.01); *H04N 13/0271* (2013.01)
USPC .............................................. 348/46; 348/62

(58) Field of Classification Search
USPC ............... 348/46, 62, 148, 163; 704/260, 271
See application file for complete search history.

(56) References Cited

U.S. PATENT DOCUMENTS

| | | | |
|---|---|---|---|
| 3,800,082 A | 3/1974 | Fish | |
| 4,012,951 A * | 3/1977 | Kessler | 73/606 |
| 4,322,744 A | 3/1982 | Stanton | |
| 5,097,326 A | 3/1992 | Meijer | |
| 6,523,006 B1 * | 2/2003 | Ellis et al. | 704/270 |
| 6,963,656 B1 | 11/2005 | Persaud et al. | |
| 2003/0026461 A1 | 2/2003 | Arthur Hunter | |
| 2003/0043270 A1 * | 3/2003 | Rafey et al. | 348/157 |
| 2003/0167125 A1 * | 9/2003 | Seemann et al. | 702/2 |
| 2003/0179133 A1 | 9/2003 | Pepin et al. | |
| 2004/0051783 A1 * | 3/2004 | Chellappa et al. | 348/46 |
| 2004/0054248 A1 * | 3/2004 | Kimchy et al. | 600/3 |
| 2005/0208457 A1 | 9/2005 | Fink et al. | |
| 2006/0072020 A1 * | 4/2006 | McCutchen | 348/218.1 |
| 2007/0159354 A1 * | 7/2007 | Rosenberg | 340/902 |
| 2007/0182812 A1 * | 8/2007 | Ritchey | 348/36 |
| 2007/0211947 A1 | 9/2007 | Tkacik | |
| 2008/0309913 A1 * | 12/2008 | Fallon | 356/4.01 |
| 2010/0103196 A1 * | 4/2010 | Kumar et al. | 345/633 |
| 2010/0265316 A1 * | 10/2010 | Sali et al. | 348/46 |

OTHER PUBLICATIONS

Balakrishnan, et al., "Wearable Real-Time Stereo Vision for the Visually Impaired", Retrieved at <<www.engineeringletters.com/issues_v14/issue_2/EL_14_2_2.pdf>>, Engineering Letters, Advance online publication, vol. 14, Issue 02, EL_14_2_2, May 16, 2007, Pages 9.

(Continued)

*Primary Examiner* — Andy Rao
*Assistant Examiner* — Jared Walker
(74) *Attorney, Agent, or Firm* — Steve Wight; Carole Boelitz; Micky Minhas

(57) ABSTRACT

A person is provided with the ability to auditorily determine the spatial geometry of his current physical environment. A spatial map of the current physical environment of the person is generated. The spatial map is then used to generate a spatialized audio representation of the environment. The spatialized audio representation is then output to a stereo listening device which is being worn by the person.

17 Claims, 8 Drawing Sheets

(56) References Cited

OTHER PUBLICATIONS

Rodriguez-Hernandez, et al., "Sensory Substitution for Visually Disabled People: Computer Solutions", Retrieved at <<www.wseas.us/e-library/transactions/biology/2010/89-346.pdf>>, World Scientific and Engineering Academy and Society (WSEAS) Transactions on Biology and Biomedicine, ISSN: 1109-9518, WSEAS, vol. 7, Issue 1, Jan. 2010, pp. 1-10.

Kawai, et al., "A Support System for Visually Impaired Persons Using Acoustic Interface—Recognition of 3-D Spatial Information", Retrieved at <<http://citeseerx.ist.psu.edu/viewdoc/download-?doi=10.1.1.8.5736&rep=rep1&type=pdf>>, Proceedings on the 16th International Conference on Pattern Recognition, vol. 04, 2002, pp. 3-7.

Katz, et al., "NAVIG: Navigation Assisted by Artificial Vision and GNSS (Global Navigation Satellite System)", Retrieved at <<www.irit.fr/~Philippe.Truillet/publications/2010/2010_Pervasive10.pdf>>, Workshop Pervasive 2010: Multimodal Location Based Techniques for Extreme Navigation, May 17, 2010, pp. 4 Helsinki, Finland.

Gonzalez-Mora, "VASIII: Development of an interactive device based on virtual acoustic reality oriented to blind rehabilitation", Retrieved at <<www.gplsi.dlsi.ua.es/congresos/mcyt03/index.php?local=pdf/tic/TIC2001>>, Jornadas de Seguimiento de Proyectos en Tecnologias Informaticas, TIC2001-3916, 2003, pp. 8, Spain.

Meijer, Peter B.L., "Mobile sensory substitution—Vision substitution", Retrieved at <<http://www.seeingwithsound.com/sensub.htm>>, Retrieved at: Feb. 15, 2011, pp. 5.

Stevens, Tim, "NAVI hack uses a Kinect to let the blind see, wear awesome headgear (video)", Web page retrieved at <<http://www.engadget.com/2011/03/17/navi-hack-uses-a-kinect-to-let-the-blind-see-wear-awesome-headg/>>, AOL Inc., Mar. 17, 2011.

\* cited by examiner

US 8,797,386 B2

AUGMENTED AUDITORY PERCEPTION FOR THE VISUALLY IMPAIRED

BACKGROUND

Of all the possible sensory disabilities, visual impairment is generally considered to be the one that has the greatest impact on a person's everyday life. A person's vision system provides them with information that forms a major basis for his mobility and ability to perform navigational tasks. A visually impaired person, such as one who is blind, incurs many challenges and inconveniences in his everyday life, especially with regard to his mobility and his ability to perform navigational tasks. For example, a visually impaired person can experience great difficulty accomplishing tasks such as moving about a room, finding a passageway out of the room or into a new room, navigating to a desired destination, and finding a desired object in his physical environment. A visually impaired person often relies upon his intact senses, which may be hearing and/or touch, to accomplish these tasks. In other words, a visually impaired person often relies upon information from his auditory system and/or his tactile system to compensate for his lack of sight information. This is commonly referred to as "vision substitution."

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Augmented auditory perception technique embodiments described herein generally involve providing a person with the ability to auditorily determine the spatial geometry of his current physical environment. In one embodiment a spatial map of the current physical environment of the person is generated. The spatial map is then used to generate a spatialized audio representation of the current physical environment. The spatialized audio representation is then output to a stereo listening device which is being worn by the person. In another embodiment a sensing device includes an object sensor, a spatial orientation sensor and an audio reproduction module. The sensing device also includes a computing device which is coupled to the object sensor, spatial orientation sensor and audio reproduction module. The object sensor and computing device operate together to generate a spatial map of the current physical environment of the person, where the spatial map identifies the current location of objects and passageways in the environment. The spatial orientation sensor and computing device operate together to determine the current spatial orientation of the sensing device. The computing device uses the spatial map to generate a spatialized audio representation of the objects and passageways, and outputs this representation to the audio reproduction module.

DESCRIPTION OF THE DRAWINGS

The specific features, aspects, and advantages of the augmented auditory perception technique embodiments described herein will become better understood with regard to the following description, appended claims, and accompanying drawings where:

DETAILED DESCRIPTION

Figure 1:
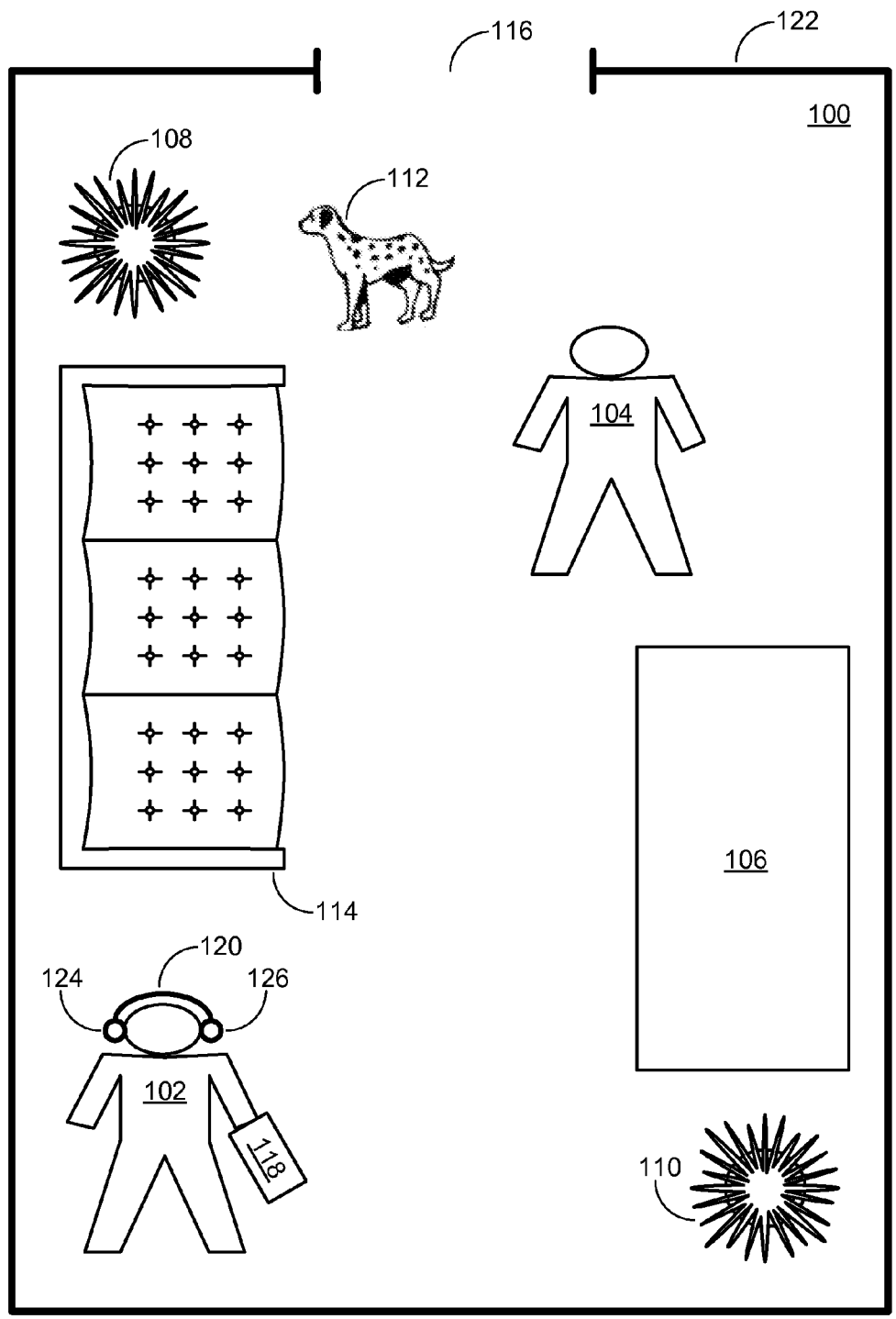
FIG. 1 is a diagram illustrating an exemplary embodiment, in simplified form, of an environmental framework for implementing the augmented auditory perception technique embodiments described herein.

In the following description of augmented auditory perception technique embodiments reference is made to the accompanying drawings which form a part hereof, and in which are shown, by way of illustration, specific embodiments in which the augmented auditory perception technique can be practiced. It is understood that other embodiments can be utilized and structural changes can be made without departing from the scope of the augmented auditory perception technique embodiments.

The term "sound source" is used herein to refer to a specific point in space that is audibly perceived as sourcing sound. The term "spatialized audio" is used herein to refer to a particular type of audio that when audibly rendered is perceived to have a three-dimensional (3D) effect in which sounds are perceived to emanate from one or more virtual sound sources that are located at specific points in space. The term "visually impaired person" is used herein to refer a person who has either limited use or no use of his vision for whatever reason. Thus, a visually impaired person includes, but is not limited to, someone whose vision system is damaged, and someone whose physical environment is dimly lit or dark.

1.0 Human Auditory Perception

Generally speaking, a person who has his hearing intact in both ears can use his ears to audibly perceive the direction and distance of a sound source in 3D space. As is appreciated in the art of the human auditory system, two cues are primarily used in the person's auditory system to achieve this perception. These cues are the inter-aural time difference and the inter-aural level difference which result from the distance between the person's ears, and from shadowing by the person's head. In addition to the inter-aural time and level difference cues, a head-related transfer function (HRTF) for the person (also known as an "anatomical transfer function") is used to estimate the location of the sound source in space. The HRTF characterizes the frequency response from a sound source to each eardrum of the person. As is appreciated in the art of spatial audio processing, the use of the HRTF for a given person (or an approximation of his HRTF) allows a virtual sound source to be synthesized to appear to the person as if it is emanating from any prescribed direction relative to his head. Additionally, a sense of distance is obtained by a mix of the just described cues plus various environmental cues (such as reverberation to direct energy ratio and reflections, among others). In the more detailed description of the augmented auditory perception technique embodiments that follows, it can be assumed that the HRTF for a visually impaired person who is not hearing impaired is known or an approximation of his HRTF is known.

Additionally, in an environment where a plurality of sounds are emanating from a plurality of sound sources at the same time, the human auditory system can exploit information in the inter-aural time difference cue, the inter-aural level difference cue, and the HRTF, and can provide the ability to selectively focus a person's listening attention on a particular sound emanating from a particular sound source. In the case where the plurality of sounds are voices emanating from a plurality of people who are talking at the same time, this selective attention is known as the "cocktail party effect." Furthermore, since a person's auditory system can reject sounds that are uncorrelated at his two ears, the person is able to focus on a particular sound emanating from a particular sound source and disregard the sound waves arriving at his ears due to venue reverberation.

2.0 Augmented Auditory Perception for the Visually Impaired

As described heretofore, a visually impaired person who is not hearing impaired (hereafter simply referred to as a "visually impaired person") often relies upon information from his auditory system to compensate for his lack of sight information. As such, a visually impaired person is acutely aware of and attentive to his acoustic environment. He regularly uses existing sources of audio information to auditorily determine the spatial geometry of his current physical environment. By way of example, but not limitation, a visually impaired person can utilize the sound of music coming through a doorway to determine the current distance and direction of the doorway from themselves. A visually impaired person can also utilize the sound of another person's voice to determine the current distance and direction, and the gender of the other person, and to also determine the approximate age and height of the other person. In some circumstances, a visually impaired person might also be able to determine the identity of the other person based on the sound of his voice. A visually impaired person can also utilize the sound of his shoes, or another person's shoes, clacking on the floor of his current physical environment to determine the extent and type of material on the floor. As also described heretofore, a visually impaired person might also rely upon information from his tactile system to further compensate for his lack of sight information. By way of example, but not limitation, a visually impaired person might physically utilize a physical probe (such as a cane, and the like) to explore his immediate vicinity.

The augmented auditory perception technique embodiments described herein generally provide a visually impaired person with the ability to auditorily determine the spatial geometry of his current physical environment. The augmented auditory perception technique embodiments are advantageous for various reasons including, but not limited to, the following. As will be appreciated from the more detailed description that follows, the augmented auditory perception technique embodiments allow the visually impaired person to auditorily determine the spatial geometry of his current physical environment regardless of whether or not the environment includes any sound sources that are actively generating sound (such as the aforementioned music and voices, among others). The augmented auditory perception technique embodiments also allow the visually impaired person to determine the current location of objects and passageways in his physical environment which do not intrinsically make noise, such as furniture, walls, doorways, stairs, and curbs, among others. Furthermore, the augmented auditory perception technique embodiments are not constrained to operating in the immediate vicinity of the visually impaired person. Rather, the augmented auditory perception technique embodiments are operational far beyond the immediate vicinity of the visually impaired person. Additionally, it is quite natural for the visually impaired person to comprehend and accurately interpret the spatialized audio that is generated for them by the augmented auditory perception technique embodiments.

2.1 Environmental Framework

FIG. 1 illustrates an exemplary embodiment, in simplified form, of an environmental framework for implementing the augmented auditory perception technique embodiments described herein. As exemplified in FIG. 1, a visually impaired person 102 is physically located within a room 100 that includes walls 122, a doorway 116, a table 106, a couch 114, two plants 108 and 110, a dog 112 and another person 104. The visually impaired person 102 holds a standalone environment sensing device 118 in one of his hands. The visually impaired person 102 can hold the sensing device 118 in either of his hands or both of his hands at the same time. The visually impaired person 102 can also move the sensing device 118 from one hand to the other at will. As will be described in more detail hereafter, rather than the sensing device 118 being held by the visually impaired person 102, alternate embodiments (not shown) of the environmental framework are also possible where the sensing device can be worn by the visually impaired person. It will thus be appreciated that the sensing device is mobile since it generally moves in conjunction with the visually impaired person as he moves about his physical environment.

Referring again to FIG. 1, the standalone environment sensing device 118 communicates with a standalone stereo listening device 120 which the person wears either over his two ears, or in his two ears, or in close proximity to his two ears. The listening device 120 includes a left side sound reproduction element 124 (such as a loudspeaker, and the like) which is physically placed either over, or in, or in close proximity to the left ear of the visually impaired person 102. The listening device 120 also includes a right side sound reproduction element 126 which is physically placed either over, or in, or in close proximity to the right ear of the visually impaired person. The listening device 120 may also include additional functionality (not shown) that will be described in more detail hereafter. It will be appreciated that the listening device 120 can be any of a variety of wearable audio reproduction devices such as a pair of stereo headphones which are worn over the person's two ears, or a pair of stereo earphones (also known as "earbuds") which are worn in the person's two ears, or a pair of bone conduction speakers which are commonly worn slightly in front of the person's two ears, among others. It will also be appreciated that the sensing device 118 can communicate with the listening device 120 via either a wired connection (not shown), or a wireless connection (not shown), or a combination of both of these types of connections.

Referring again to FIG. 1 and as will be described in more detail hereafter, the visually impaired person 102 can use the standalone environment sensing device 118 on an ongoing basis to generate a spatial map of his current physical environment (e.g., the room 100, objects therein 104, 106, 108, 110, 112, 114 and 122, and passageways therein 116). The visually impaired person can use the sensing device in a manner similar to the way a person who is not visually impaired uses a flashlight in a dark room. In other words, the visually impaired person can point the sensing device in the direction he is currently facing or in a direction he would like to move. The sensing device generates a spatial map on an ongoing basis of whatever objects 104, 106, 108, 110, 112, 114 and 122 and passageways 116 currently exist in the sensing device's field of view. The sensing device uses the spatial map on an ongoing basis to generate a spatialized audio representation of the objects and passageways. Generally speaking, the spatialized audio representation includes one or more virtual sound sources which can serve either as audible labels on the objects and passageways, or as direction identifiers, or as waypoint identifiers, or any combination thereof, among other things. The spatialized audio representation can also include another virtual sound source that provides audible navigation information to the visually impaired person.

Referring again to FIG. 1, the sensing device outputs the spatialized audio representation to the standalone stereo listening device 120. The left side and right side sound reproduction elements 124 and 126 of the listening device render the spatialized audio representation. A spatialized audio sound field which includes the virtual sound sources emanates from the left side and right side sound reproduction elements, thus providing the visually impaired person with a spatial cue for each different object and passageway in his physical environment. The visually impaired person can use his auditory system to spatially interpret the sound field and thus auditorily determine the spatial geometry of his current physical environment.

As will be described in more detail hereafter, the augmented auditory perception technique embodiments described herein are operational in various types of environmental frameworks. By way of example, but not limitation, the augmented auditory perception technique embodiments are operational in the environmental framework exemplified in FIG. 1 where the various objects therein are either stationary (e.g., the walls, table, couch and plants) or slow moving (e.g., the dog and other person). The augmented auditory perception technique embodiments are also operational in an environmental framework where one or more of the objects therein are fast moving, such as a situation where the visually impaired person is approaching a busy street having cars thereon that are fast approaching from a distance.

2.2 Standalone Environment Sensing and Stereo Listening Devices

Figure 2:
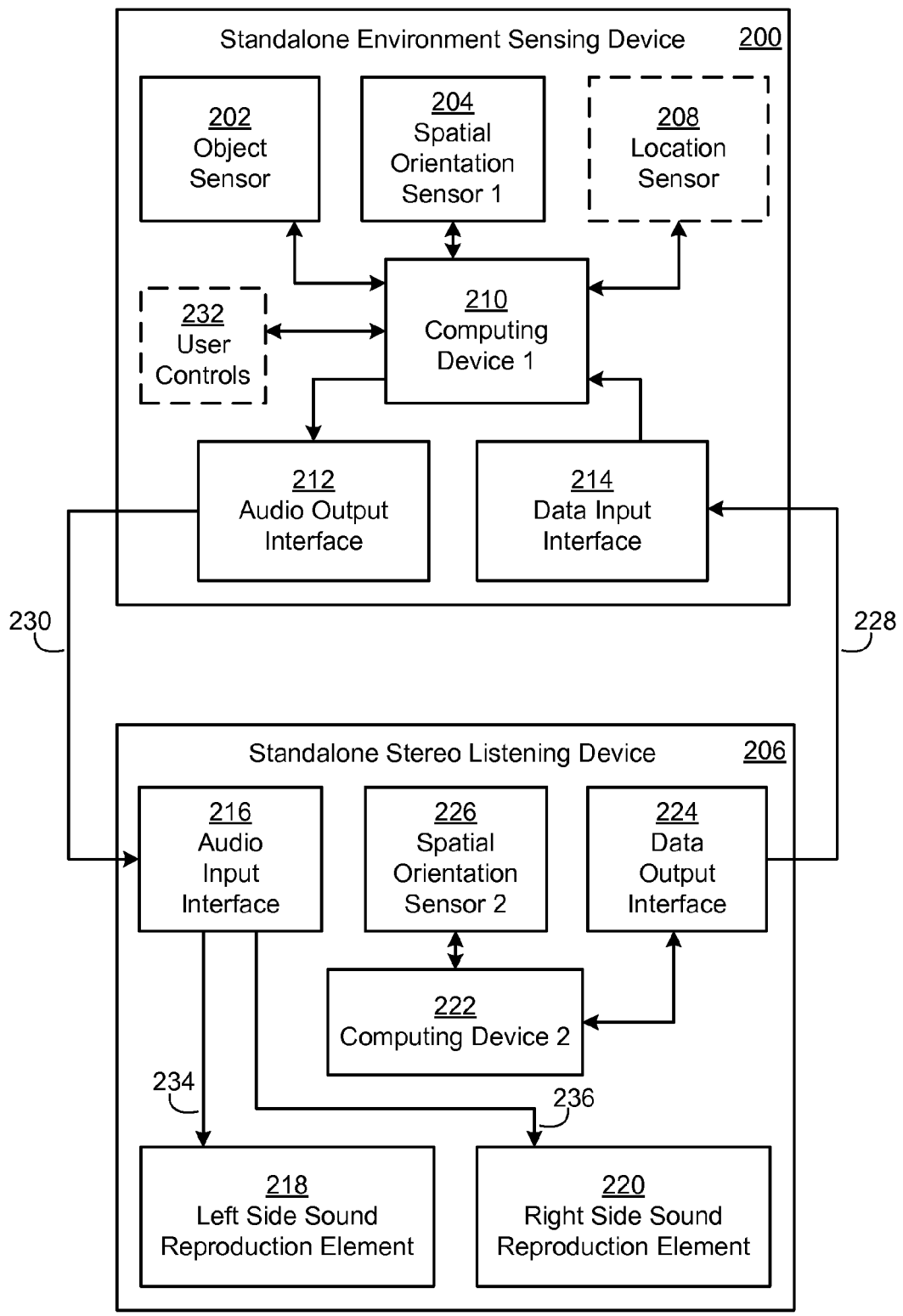
FIG. 2 is a diagram illustrating an exemplary embodiment, in simplified form, of hardware implementations for both a standalone environment sensing device which is being held by a visually impaired person in the environmental framework exemplified in FIG. 1, and a standalone stereo listening device which is being worn by the person.

FIG. 2 illustrates an exemplary embodiment, in simplified form, of hardware implementations for both the standalone environment sensing device which is being held by the visually impaired person in the environmental framework exemplified in FIG. 1, and the standalone stereo listening device which is being worn by the visually impaired person either over his two ears, or in his two ears, or in close proximity to his two ears. As exemplified in FIG. 2, the environment sensing device 200 includes an object sensor 202, a first spatial orientation sensor 204, a first computing device 210, an audio output interface 212 and a data input interface 214. The stereo listening device 206 includes an audio input interface 216, a left side sound reproduction element 218, a right side sound reproduction element 220, a second spatial orientation sensor 226, a second computing device 222 and a data output interface 224. The audio output interface 212, data input interface 214 and the stereo listening device 206 are herein collectively referred to as an audio reproduction module.

Referring again to FIG. 2, the object sensor 202 is coupled to the first computing device 210 and they generally operate together to determine the spatial geometry of the visually impaired person's current physical environment. More particularly and as will be described in more detail hereafter, the object sensor 202 and the first computing device 210 operate together to generate a spatial map of the visually impaired person's current physical environment, where the spatial map identifies the current location of objects and passageways in the environment. The first spatial orientation sensor 204 is also coupled to the first computing device 210 and they operate together to determine the current spatial orientation of the standalone environment sensing device 200. The second spatial orientation sensor 226 is coupled to the second computing device 222 and they operate together to determine the current spatial orientation of the standalone stereo listening device 206, which equates to the current spatial orientation of the visually impaired person's head since the listening device is worn thereon. The second computing device 222 outputs information 228 to the sensing device 200 via the data output interface 224, where this information includes the current spatial orientation of the visually impaired person's head. The first computing device 210 receives this information 228 via the data input interface 214. The first computing device 210 compares the current spatial orientation of the sensing device 200 to the current spatial orientation of the visually impaired person's head in order to determine the relative current pose between the sensing device and the visually impaired person's head. As will be described in more detail hereafter, in certain embodiments of the augmented auditory perception technique described herein the current distance between the sensing device 200 and the listening device 206 can optionally also be determined using the first and second spatial orientation sensors 204 and 226.

Referring again to FIG. 2, the object sensor 202 can be implemented in various ways including, but not limited to, the following. In one embodiment of the augmented auditory perception technique described herein the object sensor is an infrared projector combined with an infrared camera that is matched to the infrared projector in order to produce a depth map of the environment (hereafter simply referred to as a matching infrared camera). In another embodiment of the augmented auditory perception technique the object sensor is an ultrasound transmitter combined with an ultrasound receiver that is matched to the ultrasound transmitter (hereafter simply referred to as a matching ultrasound receiver). In yet another embodiment of the augmented auditory perception technique the object sensor is a pair of visible light video cameras (also known as RGB (red/green/blue) video cameras) which operate together as a stereo video camera. In yet another embodiment of the augmented auditory perception technique the object sensor is just a single visible light video camera. As will be described in more detail hereafter, additional embodiments of the augmented auditory perception technique are also possible where the object sensor can include various combinations of the infrared projector and matching infrared camera, the ultrasound transmitter and matching ultrasound receiver, the pair of visible light video cameras, and the single visible light video camera.

Referring again to FIG. 2, the first and second spatial orientation sensors 204 and 226 can be implemented in various ways including, but not limited to, the following. In one embodiment of the augmented auditory perception technique described herein both the first and second spatial orientation sensors are an electronic gyroscope (such as a conventional MEMS (micro-electro-mechanical systems) gyroscope, among others). In another embodiment of the augmented auditory perception technique both the first and second spatial orientation sensors are a magnetometer. In yet another embodiment of the augmented auditory perception technique both the first and second spatial orientation sensors are an accelerometer combined with a solid state compass. In yet another embodiment of the augmented auditory perception technique both the first and second spatial orientation sensors are a visible light camera. In yet another embodiment of the augmented auditory perception technique the first spatial orientation sensor is an electromagnetic field generator and the second spatial orientation sensor is an electromagnetic field sensor. In yet another embodiment of the augmented auditory perception technique the first spatial orientation sensor is an electromagnetic field sensor and the second spatial orientation sensor is an electromagnetic field generator. In each of these embodiments the first spatial orientation sensor can optionally also include a first distance measurement device (not shown) and the second spatial orientation sensor can optionally also include a second distance measurement device (not shown) that is matched to the first distance measurement device. The first and second distance measurement devices are used together to determine the current distance between the standalone environment sensing device 200 and the standalone listening device 206 (which equates to the current distance between the sensing device and the visually impaired person's head). It will be appreciated that various types of distance measurement devices can be employed. By way of example, but not limitation, the first distance measurement device can be an ultrasound receiver and the second distance measurement device can be an ultrasound transmitter that is matched to the ultrasound receiver, or vice versa.

Referring again to FIG. 2 and as will be described in more detail hereafter, the first computing device 210 uses the spatial map of the visually impaired person's current physical environment, the relative current pose between the standalone environment sensing device 200 and the visually impaired person's head, and the current distance between the sensing device and the visually impaired person's head to generate a spatialized audio representation of the current physical environment, where the spatialized audio representation includes a left channel signal and a right channel signal. The first computing device 210 outputs the spatial ized audio representation of the current physical environment 230 to the listening device 206 via the audio output interface 212. The listening device 206 receives the spatialized audio representation of the current physical environment 230 via the audio input interface 216 which delivers the left channel signal 234 to the left side sound reproduction element 218 and the right channel signal 236 to the right side sound reproduction element 220.

Referring again to FIG. 2, the standalone environment sensing device 200 can optionally include a set of user controls 232. The visually impaired person can utilize the user controls 232 to customize various aspects of the operation of the sensing device 200 including, but not limited to, the following. The visually impaired person can utilize the user controls to adjust various properties of the virtual sound sources such as the type of sound that emanates from each of the virtual sound sources, the volume of the sound that emanates from each of the virtual sound sources, and the frequency of the sound that emanates from each of the virtual sound sources, among other things. The visually impaired person can also utilize the user controls to choose different modes of operation such as a walk mode, a read mode, an analyze environment mode, and a manipulate object mode, among others. The visually impaired person can also utilize the user controls to adjust the field of view of the object sensor 202. It will be appreciated that the visually impaired person can make these adjustments both on-the-fly (i.e., when he is actively using the sensing device to determine the spatial geometry of his current physical environment) and offline (e.g., when he is not actively using the sensing device to determine the spatial geometry of his physical environment). The user controls 232 can be implemented in various ways including, but not limited to, the following. In an exemplary embodiment of the augmented auditory perception technique described herein the user controls 232 include one or more physical control elements (not shown) such as buttons, or sliders, or any combination thereof. The sensing device 200 can optionally also include a location sensor 208 which is also coupled to the first computing device 210 and operates in conjunction therewith to determine the location coordinates (such as latitude and longitude, among others) of the sensing device 200. Various types of devices can be employed for the location sensor 208 such as a global positioning system (GPS) sensor, among others.

In an alternate embodiment of the augmented auditory perception technique, rather than the standalone environment sensing device being held by the visually impaired person as just described, it can be implemented in the form of a device which is worn by the visually impaired person on his head (e.g., the sensing device can be built into a pair of eyeglasses which are worn by the visually impaired person). It will be appreciated that in this alternate embodiment a fixed spatial relationship is maintained between the sensing device and the standalone stereo listening device. Furthermore, the orientation of the sensing device continuously remains the same as the orientation of the visually impaired person's head. As such, the spatial map generated by the sensing device will be from the perspective of the visually impaired person's head. Accordingly, in this alternate embodiment the listening device need not include the second spatial orientation sensor, and the first spatial orientation sensor in the sensing device is optional.

2.3 Process Framework

Figure 3:
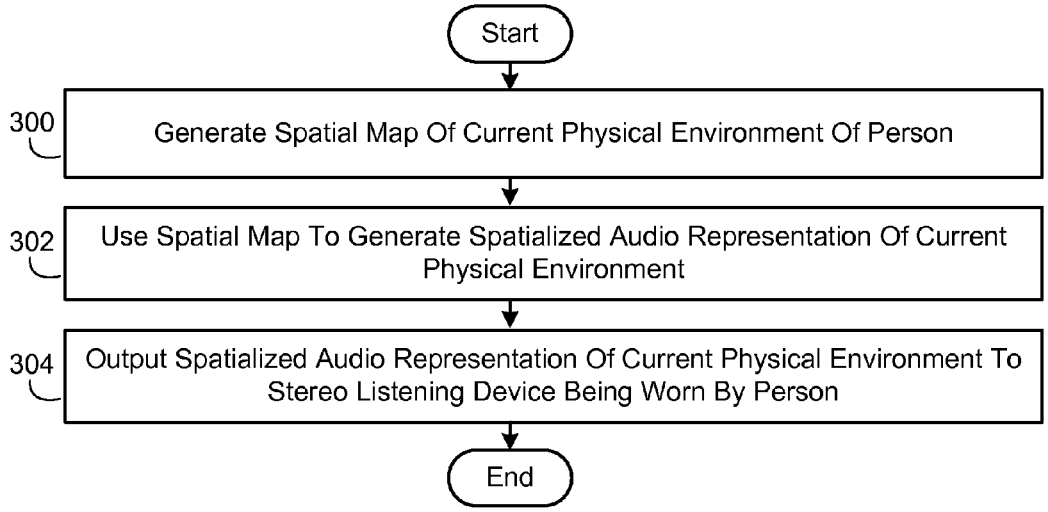
FIG. 3 is a flow diagram illustrating an exemplary embodiment, in simplified form, of a process for providing the visually impaired person with the ability to auditorily determine the spatial geometry of his current physical environment.

FIG. 3 illustrates an exemplary embodiment, in simplified form, of a process for providing a visually impaired person with the ability to auditorily determine the spatial geometry of his current physical environment. As exemplified in FIG. 3, the process starts in block 300 with generating a spatial map of the current physical environment of the visually impaired person. The spatial map is then used to generate a spatialized audio representation of the current physical environment (block 302). Finally, the spatialized audio representation of the current physical environment is output to a stereo listening device being worn by the visually impaired person (block 304).

The particular manner in which the spatial map of the current physical environment of the visually impaired person is generated and the type of spatial map that is generated depends upon the particular hardware implementation that is employed for the standalone environment sensing device. FIGS. 4-7 illustrate exemplary embodiments, in simplified form, of a process for generating the spatial map of the environment based on various hardware implementations of the standalone environment sensing device.

Figure 4:
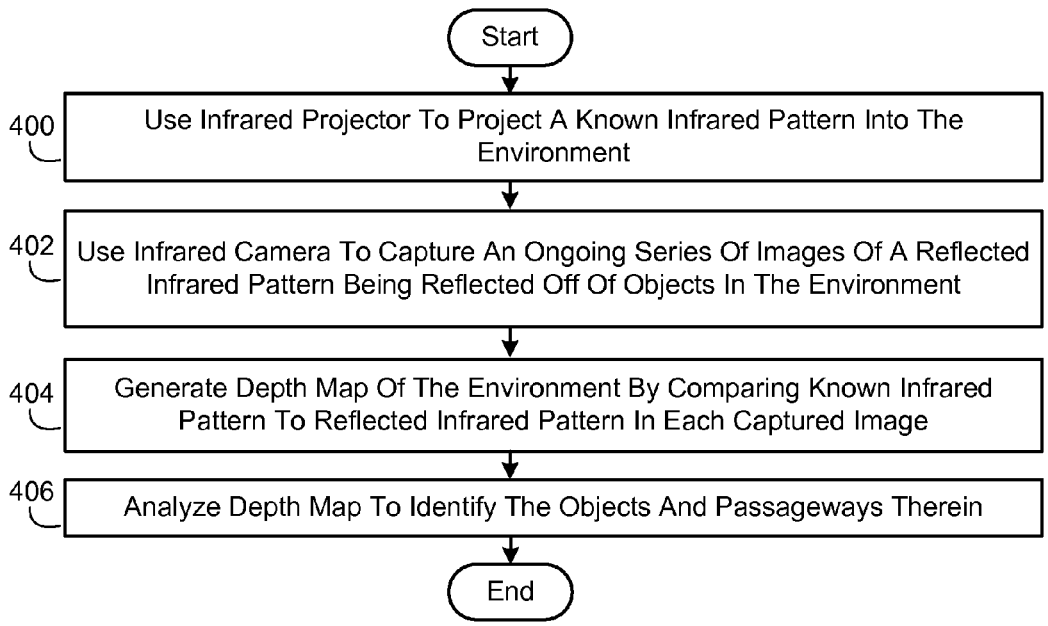
FIGS. 4-7 are flow diagrams illustrating exemplary embodiments, in simplified form, of a process for generating a spatial map of the current physical environment of the visually impaired person.

FIG. 4 illustrates an exemplary embodiment, in simplified form, of a process for generating the spatial map of the current physical environment of the visually impaired person in a situation where the standalone environment sensing device's object sensor is an infrared projector combined with a matching infrared camera. As exemplified in FIG. 4, the process starts in block 400 with the infrared projector being used to project a known infrared pattern into the environment. The infrared camera is then used to capture an ongoing series of images of a reflected infrared pattern which is being reflected off of objects that are in the environment (block 402). A depth map of the environment is then generated by using conventional methods to compare the known infrared pattern to the reflected infrared pattern in each captured image (block 404). The depth map is then analyzed using conventional methods to identify the objects and passageways therein (block 406).

Alternate embodiments of the augmented auditory perception technique described herein are also possible where the object sensor combines one or more additional devices with the infrared projector and infrared camera. By way of example, but not limitation, in one alternate embodiment of the augmented auditory perception technique a visible light video camera can be combined with the infrared projector and infrared camera. In this particular embodiment the visible light video camera can be used to capture a video stream of objects and passageways in the environment. This video stream can then be analyzed using conventional methods to identify one or more attributes of each of these objects and passageways, and these attributes can be used to augment the depth map. Exemplary object attributes which can be identified include, but are not limited to, the color of each object (assuming a color video camera is employed) and the type of each object (e.g., person, table, couch, wall, plant, dog, sign, curb, stairs, car, and the like). Exemplary passageway attributes which can be identified include, but are not limited to, the type of each passageway (e.g., doorway, window, and the like) and whether the passageway is open or closed (e.g., whether a doorway includes a door which is open or closed, and the like).

In another alternate embodiment of the augmented auditory perception technique an ultrasound transmitter and a matching ultrasound receiver can be combined with the infrared projector and infrared camera. In this particular embodiment the ultrasound transmitter and ultrasound receiver can be used to identify attributes of the objects and passageways in the environment in the following manner. The ultrasound transmitter can be used to transmit an original ultrasound signal into the environment, and the ultrasound receiver can be used to capture a return ultrasound signal being reflected off of objects in the environment. One or more attributes of each of the objects and passageways in the environment can then be identified by comparing the original ultrasound signal to the return ultrasound signal. Exemplary attributes which can be identified include whether each of the objects in the environment is hard or soft (e.g., furniture, walls, signs, cars, and the like can be identified as hard objects, and people, plants, animals, and the like can be identified as soft objects). In yet another alternate embodiment of the augmented auditory perception technique the visible light video camera, the ultrasound transmitter, and the ultrasound receiver can be combined with the infrared projector and infrared camera.

Figure 5:
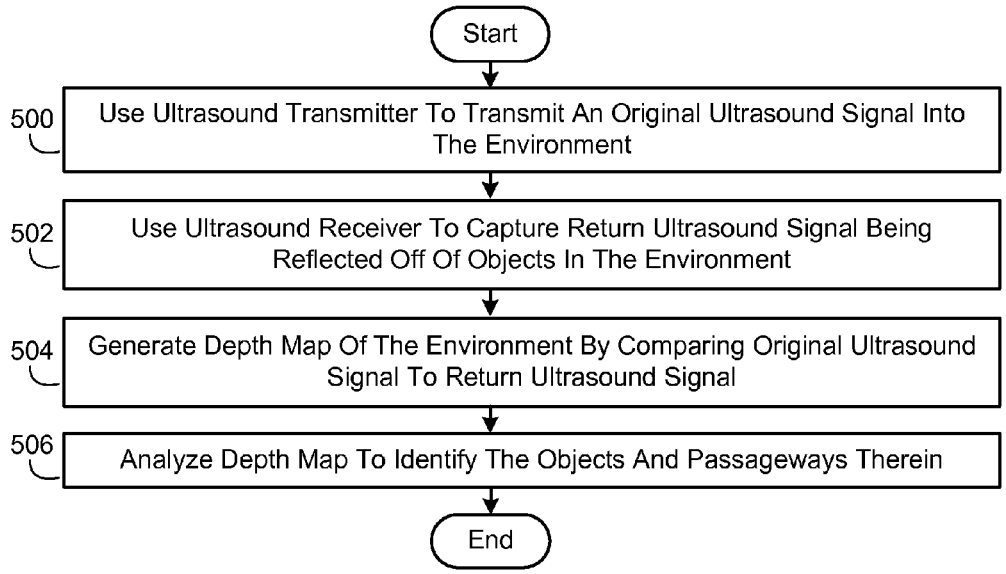

FIG. 5 illustrates an exemplary embodiment, in simplified form, of a process for generating the spatial map of the current physical environment of the visually impaired person in a situation where the standalone environment sensing device's object sensor is an ultrasound transmitter combined with a matching ultrasound receiver. As exemplified in FIG. 5, the process starts in block 500 with the ultrasound transmitter being used to transmit an original ultrasound signal into the environment. The ultrasound receiver is then used to capture a return ultrasound signal which is being reflected off of objects that are in the environment (block 502). A depth map of the environment is then generated by using conventional methods to compare the original ultrasound signal to the return ultrasound signal (block 504). The depth map is then analyzed using conventional methods to identify the objects and passageways therein (block 506). Alternate embodiments of the augmented auditory perception technique described herein are also possible where the object sensor combines one or more additional devices with the ultrasound transmitter and ultrasound receiver. By way of example, but not limitation, in an exemplary alternate embodiment of the augmented auditory perception technique a visible light video camera can be combined with the ultrasound transmitter and ultrasound receiver. In this particular embodiment the visible light video camera can be used to augment the depth map of the environment in the same way as just described.

Figure 6:
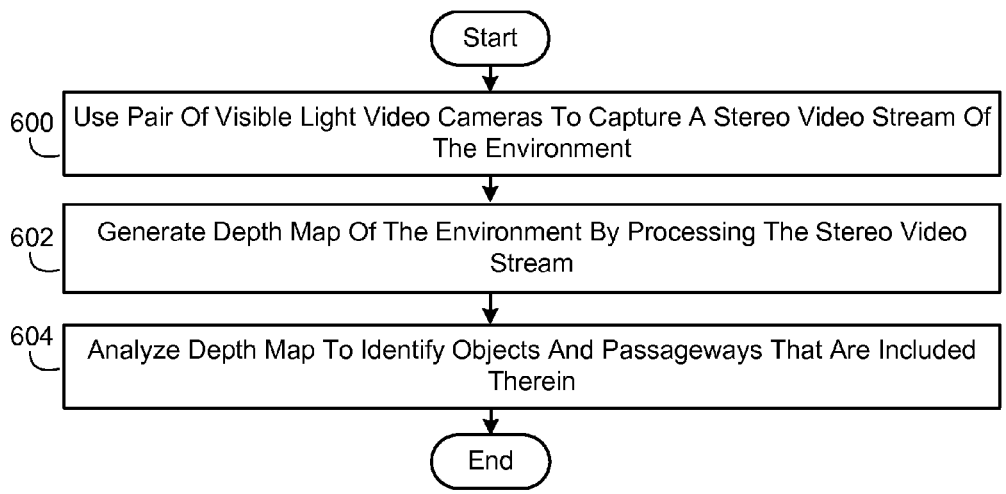

FIG. 6 illustrates an exemplary embodiment, in simplified form, of a process for generating the spatial map of the current physical environment of the visually impaired person in a situation where the standalone environment sensing device's object sensor is a pair of visible light video cameras which operate together as a stereo video camera. As exemplified in FIG. 6, the process starts in block 600 with the pair of visible light video cameras being used to capture a stereo video stream of the environment. A depth map of the environment is then generated by using conventional methods to process the stereo video stream (block 602). The depth map is then analyzed using conventional methods to identify objects and passageways that are included therein (block 604). Alternate embodiments of the augmented auditory perception technique described herein are also possible where the object sensor combines one or more additional devices with the pair of visible light video cameras. By way of example, but not limitation, in an exemplary alternate embodiment of the augmented auditory perception technique an ultrasound transmitter and a matching ultrasound receiver can be combined with the pair of visible light video cameras. In this particular embodiment the ultrasound transmitter and ultrasound receiver can be used to identify whether each of the objects identified in the depth map is hard or soft as described heretofore. Additionally, the stereo video stream can be analyzed using conventional methods to identify one or more attributes of the objects and passageways identified in the depth map, and these attributes can be used to augment the depth map as described heretofore.

Figure 7:
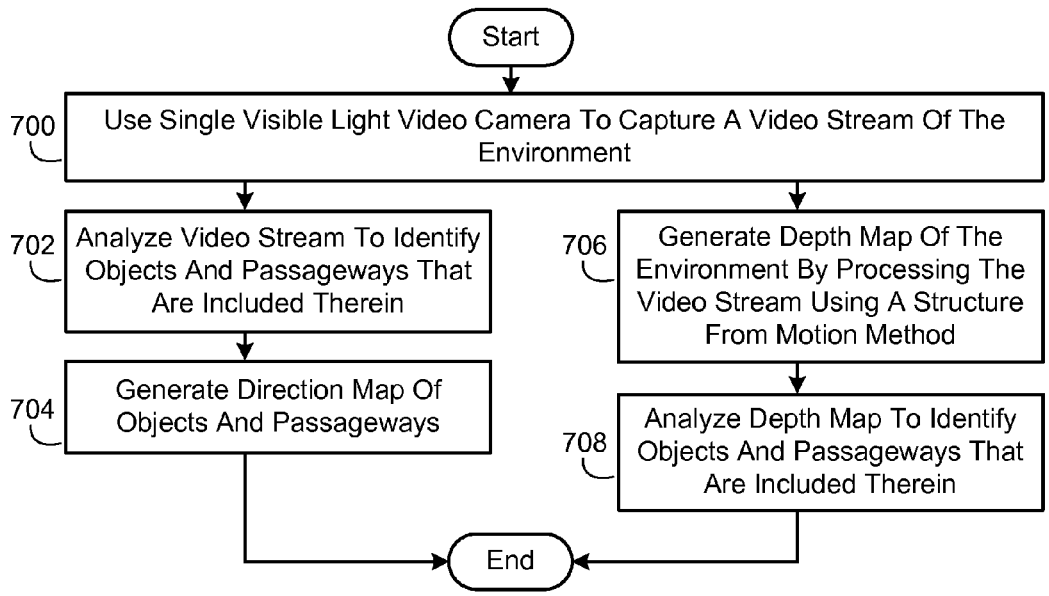

FIG. 7 illustrates exemplary embodiments, in simplified form, of a process for generating the spatial map of the current physical environment of the visually impaired person in a situation where the standalone environment sensing device's object sensor is just a single visible light video camera. As exemplified in FIG. 7, the process starts in block 700 with the single visible light video camera being used to capture a video stream of the environment. In one embodiment of the augmented auditory perception technique described herein conventional methods are then used to analyze the video stream to identify objects and passageways that are included therein (block 702) and generate a direction map of the objects and passageways (block 704), where the direction map specifies the direction of each of the objects and passageways from the perspective of the sensing device. In another embodiment of the augmented auditory perception technique a depth map of the environment is generated by processing the video stream using a conventional structure from motion method (block 706), and the depth map is then analyzed using conventional methods to identify objects and passageways that are included therein (block 708). It will be appreciated that this other embodiment generates a useful depth map of the environment due to the fact that the visually impaired person will generally be moving about the environment and will generally also be regularly moving the sensing device about the environment.

Alternate embodiments of the augmented auditory perception technique described herein are also possible where the object sensor combines one or more additional devices with the single visible light video camera. By way of example, but not limitation, in an exemplary alternate embodiment of the augmented auditory perception technique an ultrasound transmitter and a matching ultrasound receiver can be combined with the single visible light video camera. In this particular embodiment the ultrasound transmitter and ultrasound receiver can be used to identify whether each of the objects identified in the direction map or depth map is hard or soft as described heretofore. Additionally, the video stream captured by the camera can be analyzed using conventional methods to identify one or more attributes of the objects and passageways identified in the direction map or depth map, and these attributes can be used to augment the direction map or the depth map as described heretofore.

Figure 8:
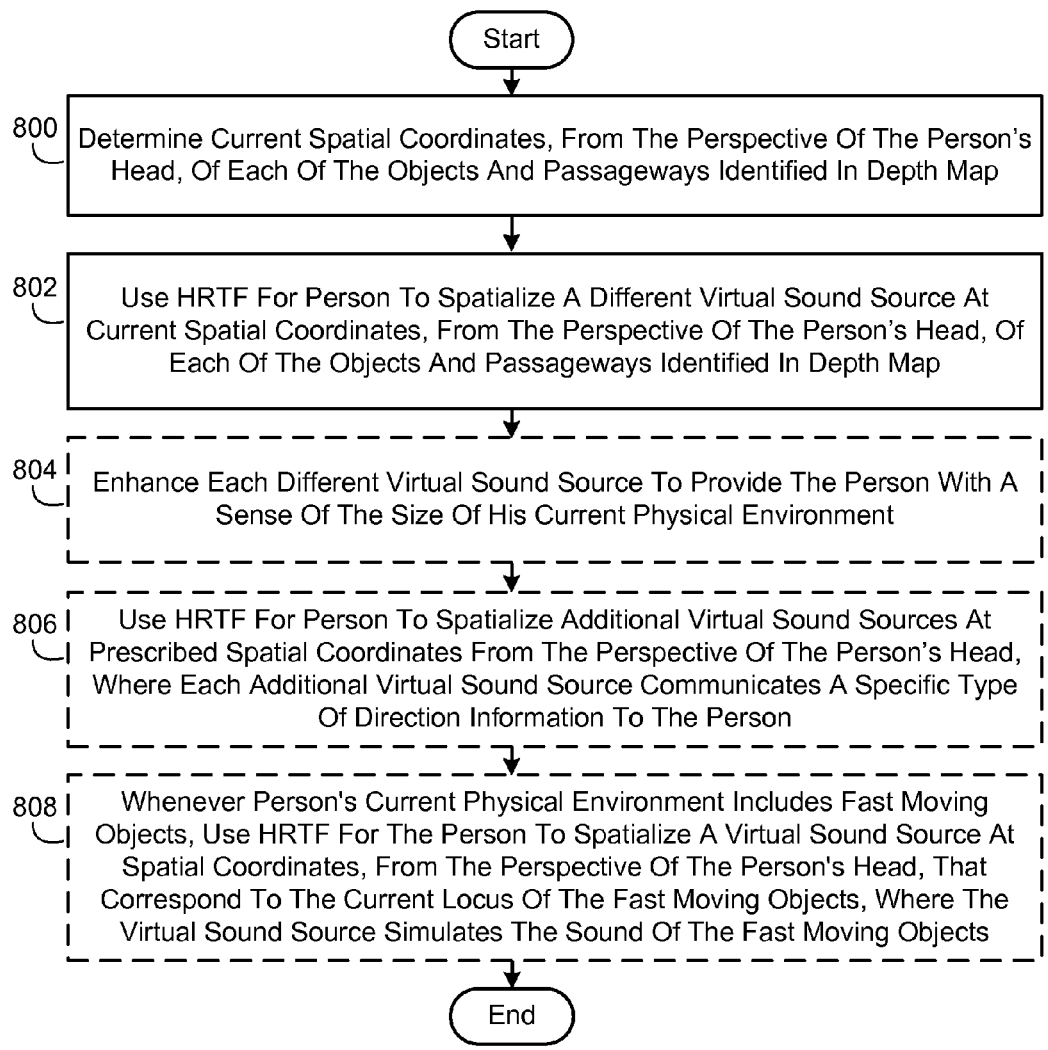
FIG. 8 is a flow diagram illustrating an exemplary embodiment, in simplified form, of a process for using a depth map of the current physical environment of the visually impaired person to generate a spatialized audio representation of the environment.

FIG. 8 illustrates an exemplary embodiment, in simplified form, of a process for using the depth map of the visually impaired person's current physical environment to generate a spatialized audio representation of the environment. As exemplified in FIG. 8, the process starts in block 800 with determining the current spatial coordinates, from the perspective of the visually impaired person's head, of each of the objects and passageways identified in the depth map. The HRTF for the visually impaired person is then used to spatialize a different virtual sound source at the current spatial coordinates, from the perspective of the visually impaired person's head, of each of the objects and passageways identified in the depth map (block 802). In other words, a given virtual sound source is "attached" to the locus of a given object or passageway.

Figure 9:
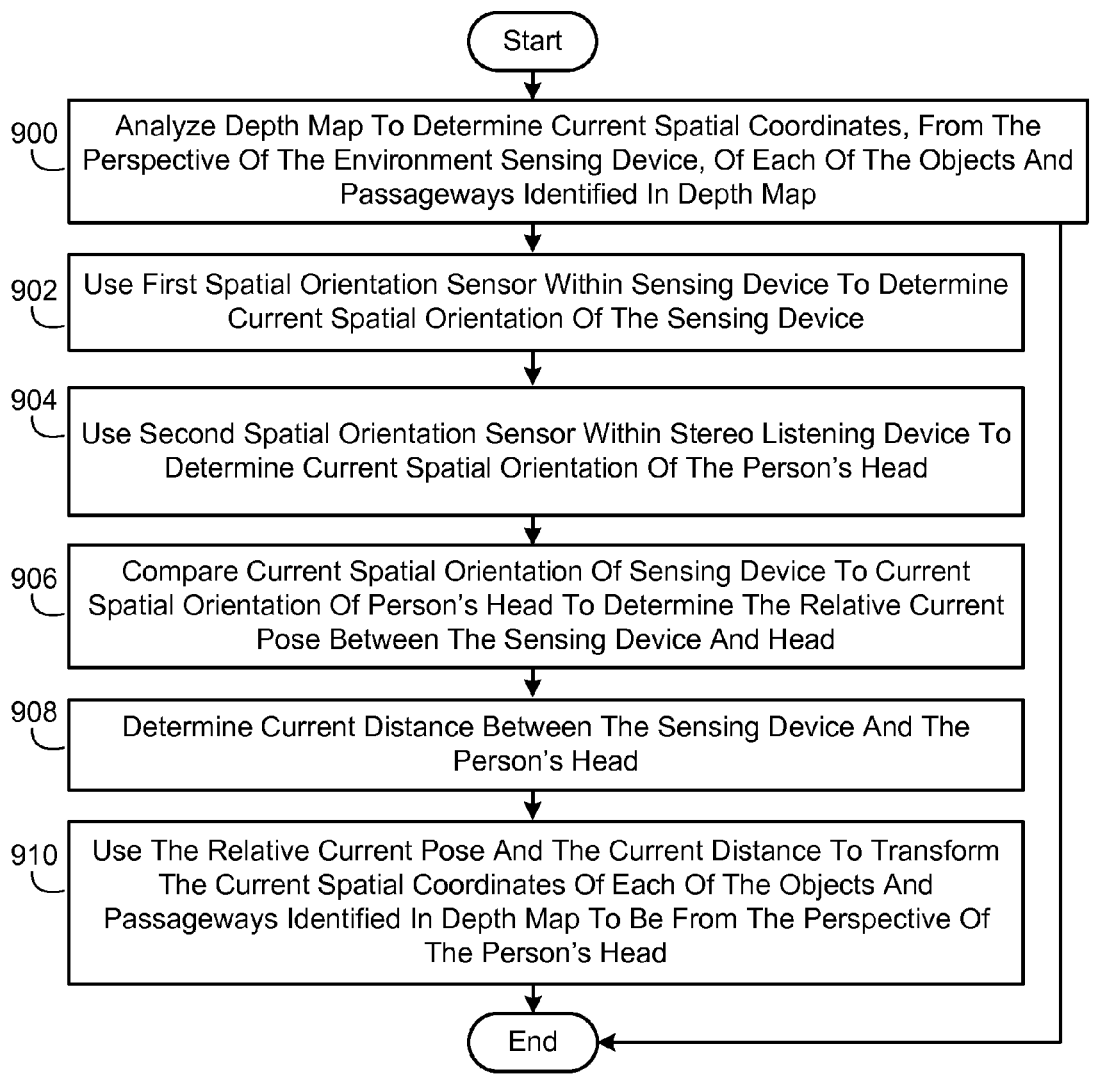
FIG. 9 is a flow diagram illustrating an exemplary embodiment, in simplified form, of a process for determining the current spatial coordinates, from the perspective of the visually impaired person's head, of each object and passageway identified in the depth map.

FIG. 9 illustrates an exemplary embodiment, in simplified form, of a process for determining the current spatial coordinates, from the perspective of the visually impaired person's head, of each of the objects and passageways identified in the depth map. As exemplified in FIG. 9, the process starts in block 900 with analyzing the depth map to determine the current spatial coordinates, from the perspective of the standalone environment sensing device, of each of the objects and passageways identified in the depth map. In the aforementioned embodiment of the augmented auditory perception technique where the standalone environment sensing device is held by the visually impaired person and thus generally moves independently from the standalone stereo listening device, the first spatial orientation sensor within the standalone environment sensing device is then used to determine the current spatial orientation of the sensing device (block 902). The second spatial orientation sensor within the standalone stereo listening device is then used to determine the current spatial orientation of the visually impaired person's head (block 904). The current spatial orientation of the sensing device is then compared to the current spatial orientation of the visually impaired person's head to determine the relative current pose between the sensing device and head (block 906). It will be appreciated that this relative current pose defines the spatial orientation of the visually impaired person's head relative to the spatial orientation of the sensing device. The current distance between the sensing device and the visually impaired person's head is then determined (block 908). In one embodiment of the augmented auditory perception technique described herein this distance is set to be a fixed prescribed value. In another embodiment of the augmented auditory perception technique the first distance measurement device within the first spatial orientation sensor and the second distance measurement device within the second spatial orientation sensor are used together to determine this distance. The relative current pose and the current distance are then used to transform the current spatial coordinates of each of the objects and passageways identified in the depth map to be from the perspective of the visually impaired person's head (block 910).

Referring again to FIG. 9, it will be appreciated that the spatial coordinate transformation of block 910 assures that the virtual sound sources are spatialized (i.e., located) at specific points in space that are "accurate" from the perspective of the visually impaired person's ears. In other words, the visually impaired person will hear where the objects and passageways are located in his environment from the perspective of his head rather than the perspective of the sensing device. It will further be appreciated that even though the visually impaired person will generally be regularly moving the sensing device about his physical environment as described heretofore, this spatial coordinate transformation assures that static objects and passageways in the environment remain static in the spatialized audio sound field that is delivered to his ears. It will yet further be appreciated that in the aforementioned embodiment of the augmented auditory perception technique where the standalone environment sensing device is implemented in the form of a device which is worn by the visually impaired person on his head, process actions 902-910 do not need to be performed since the orientation of the sensing device continuously remains the same as the orientation of the person's head and thus, the current spatial coordinates that are determined from the depth map (block 900) are already from the perspective of the person's head.

Generally speaking, each different virtual sound source generates an identifiable sound which allows the visually impaired person to determine the current location of each of the objects and passageways identified in the depth map, and may also allow the person to determine one or more attributes of each of the objects and passageways. In other words, the spatialized audio sound field that is delivered to visually impaired person's ears generally provides the person with an understanding of both the spatial geometry of his current physical environment and the nature of the objects and passageways therein. By way of example, but not limitation, in one embodiment of the augmented auditory perception technique described herein each different virtual sound source can generate the sound of a cane tapping at an identifiable periodicity. In another embodiment of the augmented auditory perception technique each different virtual sound source can generate a sound having an identifiable timbre. In yet another embodiment of the augmented auditory perception technique each different virtual sound source can generate a sound having an identifiable pitch or frequency.

In yet another embodiment of the augmented auditory perception technique each different virtual sound source can generate a different type of sound. More particularly, the characteristics of the sound that is generated by each virtual sound source can be tailored to the identified attributes of the particular object or passageway the sound source is attached to. By way of example, but not limitation, if the virtual sound source is attached to an item of furniture, the sound source can generate a prescribed musical chord, where the timbre of the chord that is generated can be determined based on a prescribed attribute (such as color, visual texture, type, and the like) of the item of furniture the chord is attached to. If the virtual sound source is attached to a person, the sound source can generate a vocal snippet, where the characteristics of the vocal snippet can be determined based on the estimated gender and age of the person). If the virtual sound source is attached to a dog, the sound source can generate a dog barking sound. If the virtual sound source is attached to a doorway, the sound source can generate a humming sound. If the doorway is closed, the sound source can "closed door" using a synthesized voice. If the virtual sound source is attached to a sign that includes text (such as an "exit" sign, or a "stop" sign, or a street sign, or the like), conventional text recognition methods can be employed to determine the text on the sign, and then the words formed by the text can be read out loud to the visually impaired person via the synthesized voice.

Referring again to FIG. 8, once a different virtual sound source has been spatialized at the current spatial coordinates, from the perspective of the visually impaired person's head, of each of the objects and passageways that is identified in the depth map (block 802), each different virtual sound source can optionally be enhanced to provide the person with a sense of the size of his current physical environment (e.g., a sense of distance) (block 804). This enhancement can be implemented in various ways including, but not limited to, the following. In one embodiment of the augmented auditory perception technique described herein conventional methods can be used to mix a direct path of the sound that emanates from each different virtual sound source with either virtual reflections off of any floor and any walls that are identified in the depth map or direction map, or reverberation and noise, or a combination of the virtual reflections, reverberation and noise. In another embodiment of the augmented auditory perception technique conventional methods can be used to either adjust the relative loudness of each different virtual sound source, or adjust the direct path to reflected path energy ratio for each different virtual sound source, or adjust the direct path to reverberation energy ratio for each different virtual sound source, or any combination thereof.

Referring again to FIG. 8, the spatialized audio representation of the visually impaired person's current physical environment can optionally be further enhanced by using the HRTF for the person to spatialize one or more additional virtual sound sources at prescribed spatial coordinates from the perspective of the visually impaired person's head, where each additional virtual sound source communicates a specific type of direction information to the visually impaired person (block 806). Exemplary types of direction information that can be communicated by a given additional virtual sound source include a prescribed cardinal direction (i.e., north, or south, or east, or west), or a prescribed ordinal direction (i.e., northeast, or southeast, or southwest, or northwest), or a waypoint, among others. In a situation where the standalone environment sensing device includes the aforementioned location sensor, the sensing device can be integrated with a conventional mapping and navigation application, and the spatialized audio representation of the visually impaired person's current physical environment can optionally be yet further enhanced by providing the person with audible navigation information which is specifically related to the environment. Exemplary mapping and navigation applications which can be use include Google Maps and Bing™ (a trademark of Microsoft Corporation) Maps, among others. Exemplary types of audible navigation information that can be provided include verbal walking directions, a verbal explanation of one or more aspects of the environment (such as the name of a road the person is on, the name of a restaurant or store the person is approaching, and the like), and verbal directions to a particular landmark in the environment, among others.

Referring again to FIG. 8, in a situation where the visually impaired person's current physical environment includes one or more fast moving objects, the spatialized audio representation of the environment can optionally be yet further enhanced by using the HRTF for the person to spatialize a virtual sound source at spatial coordinates, from the perspective of the person's head, that correspond to the current locus of the fast moving objects, where the virtual sound source simulates the sound of the fast moving objects and thus helps the person locate them (block 808). By way of example, but not limitation, in the aforementioned situation where the visually impaired person is approaching a busy street having cars thereon that are fast approaching from a distance (such that the person can't yet hear them), a virtual sound source that simulates the sound of a busy street with fast moving cars can be spatialized at spatial coordinates, from the perspective of the person's head, corresponding to the current locus of the street. This virtual sound source will thus audibly alert the visually impaired person of the cars that are fast approaching.

2.4 Combined Environment Sensing and Stereo Listening Device

Figure 10:
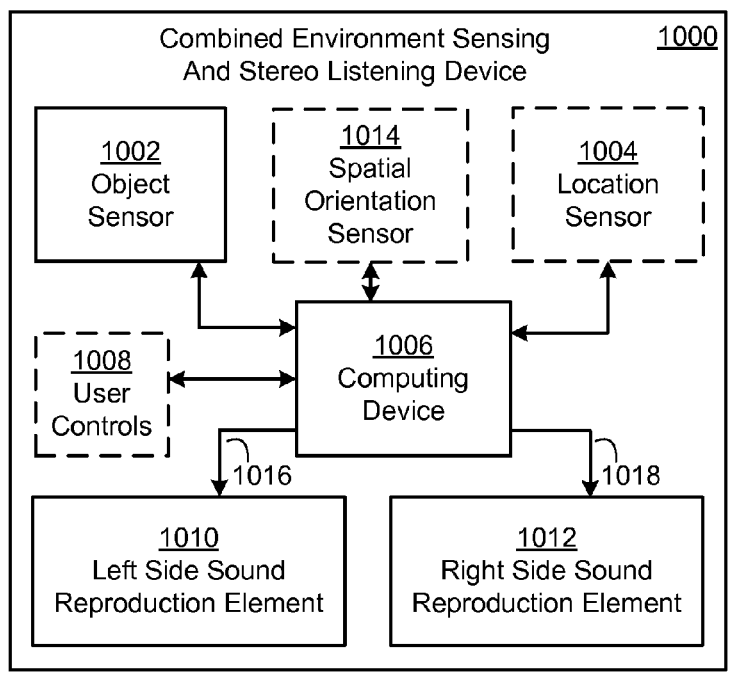
FIG. 10 is a diagram illustrating an exemplary embodiment, in simplified form, of a hardware implementation for a combined mobile environment sensing and stereo listening device which can be worn by the visually impaired person.

FIG. 10 illustrates an exemplary embodiment, in simplified form, of a hardware implementation for a combined environment sensing and stereo listening device (hereafter simply referred to as a "combined sensing and listening device") which can be worn by the visually impaired person either over his two ears, or in his two ears, or in close proximity to his two ears. In other words, FIG. 10 illustrates an embodiment where the standalone environment sensing device is integrated into the standalone stereo listening device (i.e., the aforementioned audio reproduction module is integral to the environment sensing device). As exemplified in FIG. 10, the combined sensing and listening device 1000 includes an object sensor 1002, a computing device 1006, a left side sound reproduction element 1010, and a right side sound reproduction element 1012. The object sensor 1002 and the computing device 1006 generally operate together to determine the spatial geometry of the visually impaired person's current physical environment. More particularly, the object sensor 1002 and the computing device 1006 operate together in the manner described heretofore to generate a spatial map of the visually impaired person's current physical environment, where the spatial map identifies the current location of objects and passageways in the environment.

Referring again to FIG. 10, it will be appreciated that a fixed spatial relationship is maintained between the object sensor 1002 and the left and right sound reproduction elements 1010 and 1012 (i.e., the orientation of the object sensor continuously remains the same as the orientation of the visually impaired person's head). As such, the spatial map generated by the object sensor is from the perspective of the visually impaired person's head. The object sensor 1002 can be implemented in any of the ways described heretofore for the object sensor in the standalone environment sensing device. The computing device 1006 uses the spatial map in the manner described heretofore to generate a spatialized audio representation of the current physical environment, where the spatialized audio representation includes a left channel signal and a right channel signal. The computing device 1006 outputs the left channel signal 1016 to the left side sound reproduction element 1010 and the right channel signal 1018 to the right side sound reproduction element 1012.

Referring again to FIG. 10, the combined sensing and listening device 1000 can optionally include a set of user controls 1008. The visually impaired person can utilize the user controls 1008 to customize various aspects of the operation of the sensing and listening device 1000 including, but not limited to, the following. The visually impaired person can utilize the user controls to adjust various properties of the virtual sound sources such as the type of sound that emanates from each of the virtual sound sources, the volume of the sound that emanates from each of the virtual sound sources, and the frequency of the sound that emanates from each of the virtual sound sources, among other things. The visually impaired person can also utilize the user controls to adjust the field of view of the object sensor 1002. It will be appreciated that the visually impaired person can make these adjustments both on-the-fly (i.e., when he is actively using the sensing and listening device 1000 to determine the spatial geometry of his current physical environment) and offline (e.g., when he is not actively using the sensing and listening device to determine the spatial geometry of his physical environment). The user controls 1008 can be implemented in any of the ways described heretofore for the user controls in the standalone environment sensing device.

Referring again to FIG. 10, the combined sensing and listening device 1000 can optionally also include a location sensor 1004 which operates in conjunction with the computing device 1006 to determine the location coordinates of the sensing and listening device 1000. Various types of devices can be employed for the location sensor 1004 such as a GPS sensor, among others. The sensing and listening device 1000 can optionally also include a spatial orientation sensor 1014 which operates in conjunction with the computing device 1006 to determine the current spatial orientation of the sensing and listening device 1000. Various types of devices can be employed for the spatial orientation sensor 1014 such as a magnetometer, or a solid state compass, among others.

3.0 Additional Embodiments

While the augmented auditory perception technique has been described by specific reference to embodiments thereof, it is understood that variations and modifications thereof can be made without departing from the true spirit and scope of the augmented auditory perception technique. By way of example but not limitation, rather than each different virtual sound source being spatialized at the current spatial coordinates (from the perspective of the visually impaired person's head) of each of the objects and passageways that is identified in the depth map, a plurality of different virtual sound sources can be distributed along a uniform grid of spatial coordinates (again from the perspective of the person's head), where the grid is established based on the current spatial coordinates of each of the objects and passageways that is identified in the depth map. In this particular embodiment the type and characteristics of the sound that emanates from each of the virtual sound sources can be tailored to the identified attributes (such as type, among others) of the object the sound source is attached to. Furthermore, the environment sensing device can include an offline calibration mode during which the sensing device sequentially spatializes a plurality of virtual sound sources at prescribed spatial coordinates from the perspective of the visually impaired person's head, and the person then positions the sensing device to point to the location in space that he perceives each of the sound sources to emanate from.

Additionally, as part of the analysis of either the depth map or the video stream of the visually impaired person's current physical environment to identify the objects and passageways that are included therein, images of one or more objects can be transmitted to another computing device for recognition. Furthermore, a uniquely identifiable barcode label can be affixed to one or more of the objects in the environment, and in the case where the environment sensing device includes a visible light video camera the video stream captured by the camera can be analyzed to decode the barcode label. Similarly, a radio frequency identification (RFID) tag can be affixed to one or more of the objects in the environment and an RFID sensor can be included within the environment sensing device. Regarding the situation where the current physical environment includes one or more other people in addition to the visually impaired person, in the case where the environment sensing device includes a visible light video camera the video stream captured by the camera can be analyzed using conventional face recognition methods to determine if the environment includes any familiar faces. A determination can also be made as to whether or not any of the other people are currently facing the visually impaired person. Yet furthermore, in order to circumvent the limitations of computer vision in identifying objects and analyzing scenes, the video stream or any of the other forms of sensed environment information described herein can be transmitted to a remote person for interpretation. The remote person can then either talk directly to the visually impaired person, or input an interpretation that will be converted into a spatialized audio representation thereof.

It is also noted that any or all of the aforementioned embodiments can be used in any combination desired to form additional hybrid embodiments. Although the augmented auditory perception technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

This section provides a brief, general description of a suitable computing system environment in which portions of the augmented auditory perception technique embodiments described herein can be implemented. These augmented auditory perception technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 11:
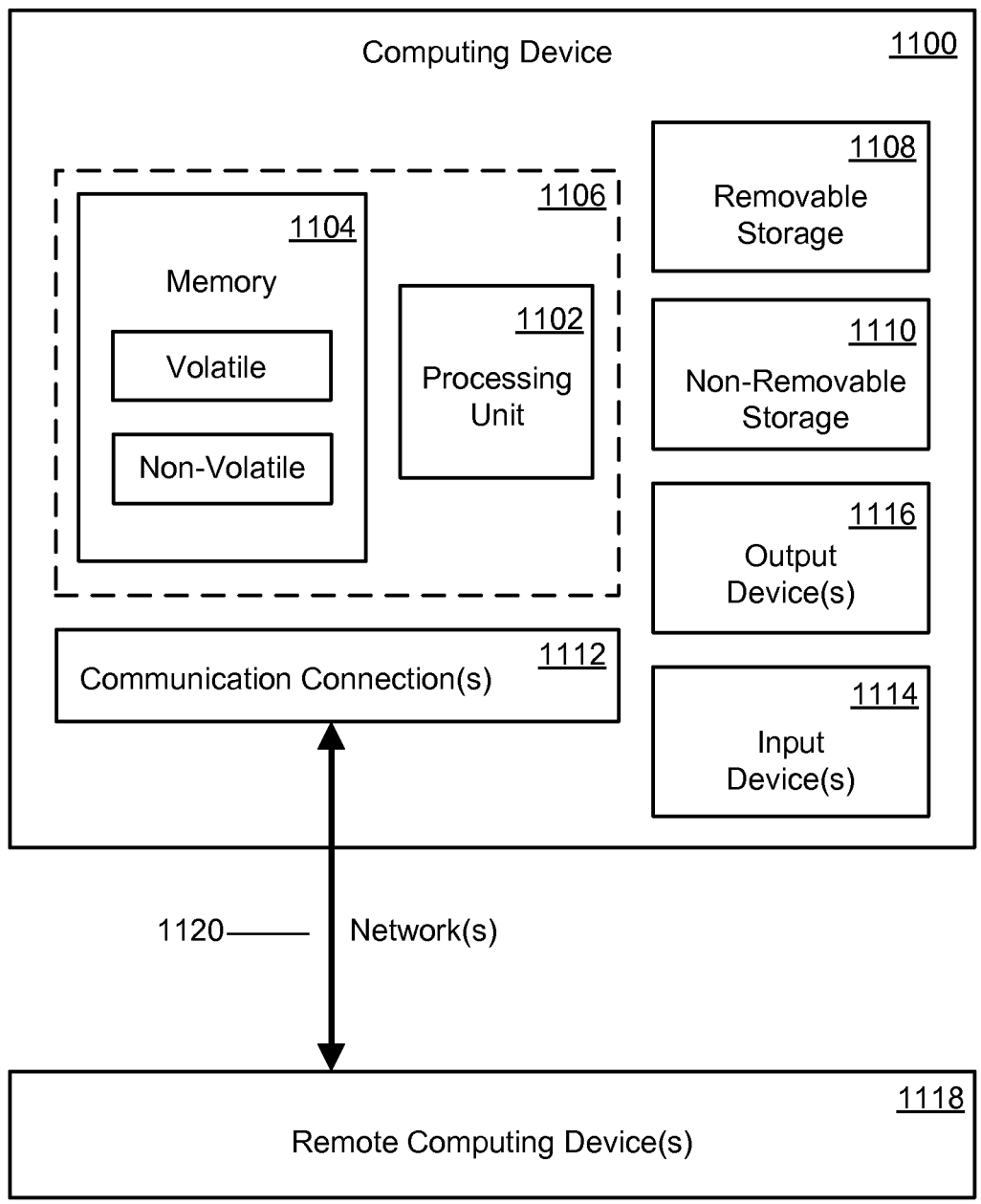
FIG. 11 is a diagram illustrating an exemplary embodiment, in simplified form, of a general purpose, network-based computing device which constitutes an exemplary system for implementing portions of the augmented auditory perception technique embodiments described herein.

FIG. 11 illustrates an exemplary embodiment, in simplified form, of a suitable computing system environment according to the augmented auditory perception technique embodiments described herein. The environment illustrated in FIG. 11 is only one example of a suitable computing system environment and is not intended to suggest any limitation as to the scope of use or functionality of the augmented auditory perception technique embodiments described herein. Neither should the computing system environment be interpreted as having any dependency or requirement relating to any one or combination of components exemplified in FIG. 11.

As exemplified in FIG. 11, an exemplary system for implementing portions of the augmented auditory perception technique embodiments described herein includes one or more computing devices, such as computing device 1100. In its simplest configuration, computing device 1100 typically includes at least one processing unit 1102 and memory 1104. Depending on the specific configuration and type of computing device, the memory 1104 can be volatile (such as RAM), non-volatile (such as ROM and flash memory, among others) or some combination of the two. This simplest configuration is illustrated by dashed line 1106.

As exemplified in FIG. 11, computing device 1100 can also have additional features and functionality. By way of example, computing device 1100 can include additional storage such as removable storage 1108 and/or non-removable storage 1110. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 1100 such as computer readable instructions associated with an operating system, application programs and other program modules, and data structures, among other things. Memory 1104, removable storage 1108 and non-removable storage 1110 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 1100. Any such computer storage media can be part of computing device 1100.

As exemplified in FIG. 11, computing device 1100 also includes a communications connection(s) 1112 that allows the device to operate in a networked environment and communicate with a remote computing device(s), such as remote computing device(s) 1118. Remote computing device(s) 1118 can be any of the aforementioned computing systems, environments, and/or configurations, or can be a router, a peer device, or other common network node, and typically includes many or all of the elements described herein relative to computing device 1100. The remote computing device(s) 1118 may also display information to, and receive information from, another person who provides assistive analysis or services. Communication between computing devices takes place over a network(s) 1120, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 1112 and related network(s) 1120 described herein are exemplary and other means of establishing communication between the computing devices can be used.

As exemplified in FIG. 11, communications connection(s) 1112 and related network(s) 1120 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 11, computing device 1100 also includes a user interface which includes one or more input devices 1114 and one or more output devices 1116. Exemplary input devices 1114 include, but are not limited to, a keyboard, mouse, pen, touch input device, audio input device (such as a microphone and the like), and camera, among others. A user can enter commands and various types of information into the computing device 1100 through the input device(s) 1114. Exemplary output devices 1116 include, but are not limited to, a display device(s), printer, and audio output devices (such as one or more loudspeakers, headphones, bone conduction speakers, and the like), among others. These input and output devices are well known and need not be described at length here.

Referring again to FIG. 11, the augmented auditory perception technique embodiments described herein can be further described and/or implemented in the general context of computer-executable instructions, such as program modules, which are executed by computing device 1100. Generally, program modules include routines, programs, objects, components, and data structures, among other things, that perform particular tasks or implement particular abstract data types. The augmented auditory perception technique embodiments can also be practiced in a distributed computing environment where tasks are performed by one or more remote computing devices 1118 that are linked through a communications network 1112/1120. In a distributed computing environment, program modules can be located in both local and remote computer storage media including, but not limited to, memory 1104 and storage devices 1108/1110. Still further, the aforementioned instructions could be implemented, in part or in whole, as hardware logic circuits, which may or may not include a processor.

Wherefore, what is claimed is:

1. A computer-implemented process for providing a person with the ability to auditorily determine the spatial geometry of his current physical environment, comprising:
using a computer to perform the following process actions:
generating a depth map of the current physical environment of the person;
analyzing the depth map to identify objects and passageways therein;
analyzing the depth map to determine the current spatial coordinates, from the perspective of an environment sensing device being held by the person, of each of the identified objects and passageways;
using a first spatial orientation sensor within the sensing device to determine the current spatial orientation of the sensing device;
using a second spatial orientation sensor within a stereo listening device being worn on the head of the person to determine the current spatial orientation of the head of the person, wherein the second spatial orientation sensor is located at a distance from the first spatial orientation sensor;
comparing the current spatial orientation of the sensing device to the current spatial orientation of the head of the person to determine a relative current pose between the sensing device and head;
determining the current distance between the sensing device and head;

using said current pose and current distance to transform the current spatial coordinates of each of the identified objects and passageways to be from the perspective of the head of the person;
using the depth map to generate a spatialized audio representation of the current physical environment; and
outputting said spatialized audio representation to the stereo listening device.

2. The process of claim 1, wherein the process action of generating a depth map of the current physical environment of the person comprises the actions of:
using an infrared projector to project a known infrared pattern into said environment;
using an infrared camera that is matched to the infrared projector to capture an ongoing series of images of a reflected infrared pattern being reflected off of objects in said environment; and
generating the depth map of said environment by comparing the known infrared pattern to the reflected infrared pattern in each captured image.

3. The process of claim 1, wherein the process action of generating a depth map of the current physical environment of the person comprises the actions of:
using an ultrasound transmitter to transmit an original ultrasound signal into said environment;
using an ultrasound receiver that is matched to the ultrasound transmitter to capture a return ultrasound signal being reflected off of objects in said environment; and
generating the depth map of said environment by comparing the original ultrasound signal to the return ultrasound signal.

4. The process of claim 1, wherein the process action of generating a depth map of the current physical environment of the person comprises the actions of:
using a pair of visible light video cameras to capture a stereo video stream of said environment; and
generating the depth map of said environment by processing the stereo video stream.

5. The process of claim 1, wherein the process action of generating a depth map of the current physical environment of the person comprises the actions of:
using a single visible light video camera to capture a video stream of said environment; and
generating the depth map of said environment by processing the video stream using a structure from motion method.

6. The process of claim 1, wherein the process action of analyzing the depth map to identify objects and passageways therein comprises the actions of:
using a visible light video camera to capture a video stream of objects and passageways in the current physical environment of the person; and
analyzing the video stream to identify one or more attributes of each of said objects and passageways.

7. The process of claim 1, wherein the process action of analyzing the depth map to identify objects and passageways therein comprises the actions of:
using an ultrasound transmitter to transmit an original ultrasound signal into the current physical environment of the person;
using an ultrasound receiver that is matched to the ultrasound transmitter to capture a return ultrasound signal being reflected off of objects in said environment; and
identifying one or more attributes of each of the objects and passageways in said environment by comparing the original ultrasound signal to the return ultrasound signal.

8. The process of claim 7, wherein the attributes of each of the objects comprise whether the object is hard or soft.

9. The process of claim 1, wherein, the process action of using the depth map to generate a spatialized audio representation of the current physical environment comprises an action of using a head-related transfer function (HRTF) for the person to spatialize a different virtual sound source at the current spatial coordinates, from the perspective of the head of the person, of each of the identified objects and passageways, each sound source generating an identifiable sound.

10. The process of claim 9, wherein the process action of using the depth map to generate a spatialized audio representation of the current physical environment further comprises using the HRTF for the person to spatialize one or more additional virtual sound sources at prescribed spatial coordinates from the perspective of the head of the person, wherein each additional virtual sound source communicates a specific type of direction information to the person, said information comprising one of a prescribed cardinal direction, or a prescribed ordinal direction, or a waypoint.

11. The process of claim 9, wherein the process action of using the depth map to generate a spatialized audio representation of the current physical environment further comprises providing the person with audible navigation information which is specifically related to said environment, said information comprising verbal directions to a particular landmark in said environment.

12. The process of claim 9, wherein whenever the current physical environment of the person comprises one or more fast moving objects, the process action of using the depth map to generate a spatialized audio representation of the current physical environment further comprises using the HRTF for the person to spatialize a virtual sound source at spatial coordinates, from the perspective of the head of the person, that correspond to the current locus of the fast moving objects, wherein said sound source simulates the sound of the fast moving objects.

13. A computer-implemented process for providing a person with the ability to auditorily determine the spatial geometry of his current physical environment, comprising:
using a computer to perform the following process actions:
using an infrared projector to project a known infrared pattern into the current physical environment of the person;
using an infrared camera that is matched to the infrared projector to capture an ongoing series of images of a reflected infrared pattern being reflected off of objects in said environment;
generating a depth map of said environment by comparing the known infrared pattern to the reflected infrared pattern in each captured image;
analyzing the depth map to identify objects and passageways therein;
analyzing the depth map to determine the current spatial coordinates, from the perspective of an environment sensing device being held by the person, of each of the identified objects and passageways;
using a first spatial orientation sensor within the sensing device to determine the current spatial orientation of the sensing device;
using a second spatial orientation sensor within a stereo listening device being worn by the person to determine the current spatial orientation of the head of the person, wherein the second spatial orientation sensor is located at a distance from the first spatial orientation sensor;

comparing the current spatial orientation of the sensing device to the current spatial orientation of the head of the person to determine a relative current pose between the sensing device and head;

determining the current distance between the sensing device and head;

using said current pose and current distance to transform the current spatial coordinates of each of the identified objects and passageways to be from the perspective of the head of the person;

using a head-related transfer function for the person to generate a spatialized audio representation of said environment by spatializing a different virtual sound source at the transformed current spatial coordinates of each of the identified objects and passageways, wherein each sound source generates an identifiable sound; and outputting said spatialized audio representation to the listening device.

14. The process of claim 13, further comprising the actions of:

using a visible light video camera to capture a video stream of said environment; and analyzing the video stream to identify one or more attributes of each of the identified objects and passageways, wherein the identifiable sound generated by each sound source comprises characteristics which are tailored to the identified attributes of the particular object or passageway the sound source is attached to.

15. The process of claim 9, wherein the process action of using the depth map to generate a spatialized audio representation of the current physical environment further comprises an action of mixing a direct path of the sound that emanates from each different virtual sound source with either virtual reflections off of any floor or any walls identified in the depth map, or reverberation and noise, or a combination of said virtual reflections, reverberation and noise.

16. The process of claim 9, wherein the process action of using the depth map to generate a spatialized audio representation of the current physical environment further comprises an action of adjusting the direct path to reflected path energy ratio for each different virtual sound source.

17. The process of claim 9, wherein the process action of using the depth map to generate a spatialized audio representation of the current physical environment further comprises an action of adjusting the direct path to reverberation energy ratio for each different virtual sound source.

* * * * *